March 26, 1929. S. SMITH 1,706,635
BRAKE
Filed March 17, 1927
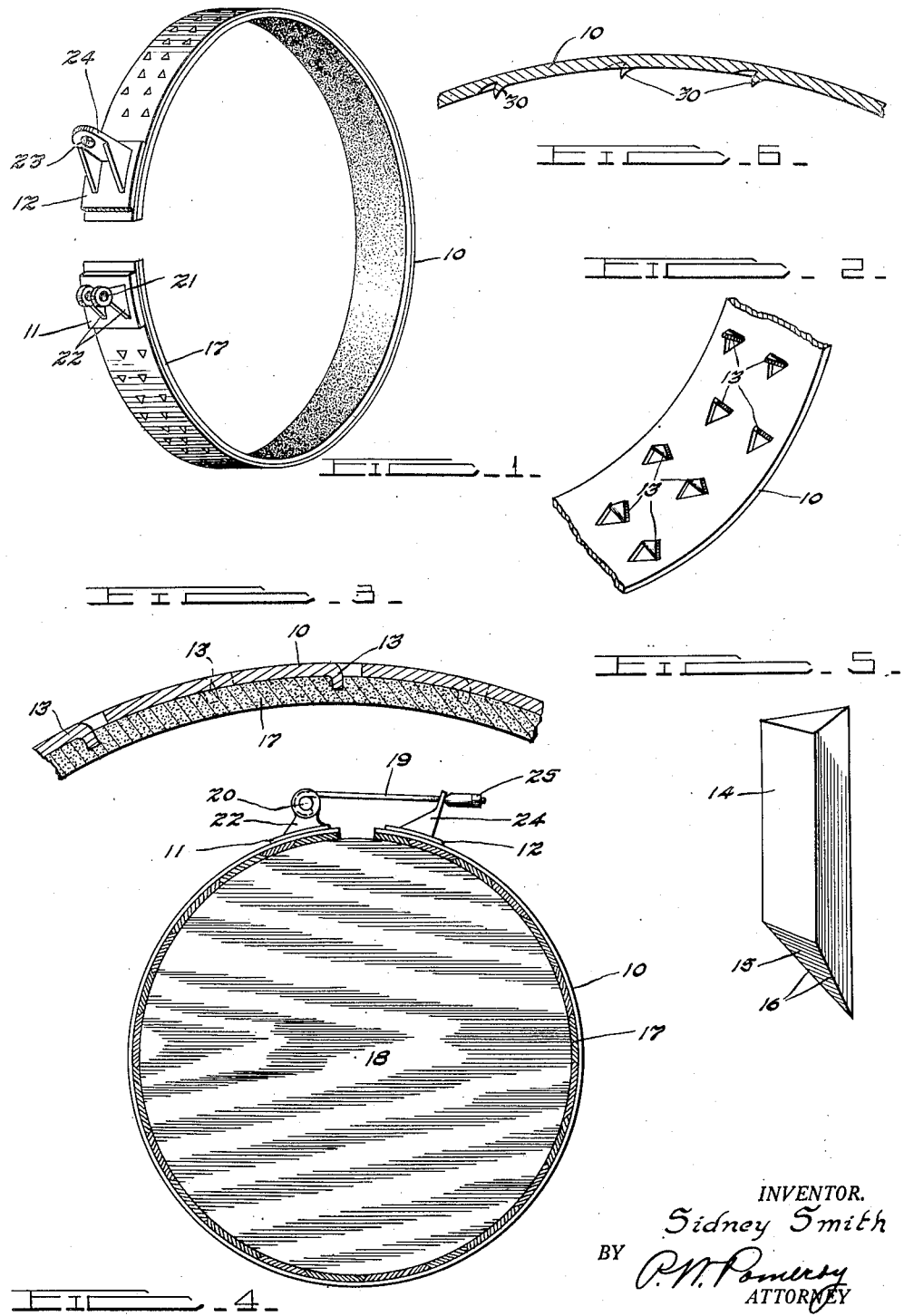
INVENTOR.
Sidney Smith
BY
ATTORNEY Patented Mar. 26, 1929.

1,706,635

UNITED STATES PATENT OFFICE.

SYDNEY SMITH, OF SOUTH BEND, INDIANA, ASSIGNOR TO THE STUDEBAKER CORPORATION, OF SOUTH BEND, INDIANA, A CORPORATION OF NEW JERSEY.

BRAKE.

Application filed March 17, 1927. Serial No. 176,020.

This invention relates to vehicle brakes and particularly to the brake bands and linings therefor.

Heretofore the brake lining has always been secured to the brake band by rivets, the heads of which are countersunk into the lining. This conventional method has at least one objectionable feature, namely, that when the brake lining wears down after continuous use, the heads of the rivets appear and contact with the brake drum, which causes the brakes to "squeal" when the same are applied. To overcome this and other objectionable features, it is the principal object of this invention to provide a new and novel brake band construction which does not require the use of rivets to secure the brake lining thereto and which does not "squeal" when the brakes are applied.

Another object is to provide a brake band with a plurality of inwardly extending projections formed of the metal thereof, which are adapted to engage with the brake lining to prevent circumferential displacement of the lining relative to the brake band.

Another object is to provide a novel method for securing a friction lining to brake bands consisting in forming the brake band with a plurality of sharp pointed projections, in coating the outer face of the friction lining with an adhesive substance, in positioning the lining concentrically within the band and clamping the band around a cylindrical template, the projections embedding themselves in the lining and the adhesive substance hardening to retain the lining and band in fixed contacting relationship when the same are removed from the template.

These being among the objects of the present invention, the same consists of certain features of construction and combinations of parts to be hereinafter described with reference to the accompanying drawing and then claimed, having the above and other objects in view.

In the accompanying drawing, which illustrates a suitable embodiment of the present invention, Figure 1 is a perspective view of an external brake band having a lining of friction material secured thereto.

Figure 2 is an enlarged perspective view of the brake band showing the projections formed thereon.

Figure 3 is an enlarged circumferential section of a portion of the brake band shown in Figure 1, illustrating the brake band projections embedded in the brake lining.

Figure 4 is a plan view of the brake band and lining showing the same clamped around the template for the purpose of drawing the band and lining together.

Figure 5 is an enlarged perspective view of the punch which may be used for forming the projections on the brake band.

Figure 6 is a circumferential section of a modification of the brake band shown in Figure 2.

Referring to the accompanying drawing in which like numerals refer to like parts throughout the several views, the brake band 10 is of the conventional type formed from a single piece of thin-sectioned sheet metal. Secured at one end of the brake band 10 is the bracket member 11, which pivotally supports the band 10 on the support, and secured at the other end is the bracket 12, to which the brake band contracting bolt is attached when the band is assembled to the brake structure.

As shown in Figures 2 and 3, the brake band 10 is provided with a plurality of inwardly extending triangularly shaped projections 13 which are formed by punching portions of the metal and bending the same inwardly substantially perpendicular to the band at that point. These projections are preferably formed in rows, each of which is staggered in relation to the preceding row. A three-sided punch 14 shown in Figure 5 may be used to form the projections 13 and the end thereof is beveled from the intersection of two adjacent sides back to the third side to provide two cutting edges 16 which meet in a sharp point. A number of these punches may be used to form a plurality of the projections in a single operation and when they are brought into contact with the band 10, each punch 14 first pierces the metal and then passes therethrough, the cutting edges 16 shearing off a tongue portion which the bevel face 15 on the end of the punch 14 bends down, so that it is substantially perpendicular to the band 10, the opening left thereby being of triangular shape. In Figure 2, the size of the projections 13 is somewhat exaggerated to better illustrate the shape thereof, but the height is preferably about the same as the thickness of the brake band 10 which, in conventional constructions, is usually about one-half the thickness of the brake lining 17 which is secured thereto.

Before the conventional brake lining 17 is secured to the brake band 10, the outer face thereof is coated with a suitable adhesive substance. The lining 17 is then positioned around a cylindrical template 18 of the correct diameter and the brake band 10 is positioned concentrically around the lining 17, the projections 13 abutting against the outer face thereof and the ends being in line with the ends of the lining 17. A bolt 19 having a hooked end is hooked around a pin 20, which extends through the openings 21 in the projecting ears 22 of the bracket 11 and the threaded end of the bolt 19 is passed through an opening 23 in the upstanding leg 24 of the bracket 12 on the opposite end. A nut 25 is threaded on the end of the bolt 19 projecting through the bracket 12 to draw the ends of the band 10 inwardly toward each other around the template 18. During the operation, the projections 13 pierce the lining 17 and embed themselves therein and the band 10 and lining 17 are brought into contacting relationship. The brake band 10 and lining 17 are left in this clamped position around the template 18 until the adhesive substance hardens to secure the lining 17 to the inner face of the brake band 10. After the adhesive substance has hardened, the nut 25 and bolt 19 may be detached to allow the brake band 10 to be disengaged from the template 18 so that it may be assembled to a brake structure.

As illustrated in Figure 6, a modification of the brake band 10 is shown to be provided with a plurality of projections 30, which are not formed by running the punch through the band, as in Figure 2, but by piercing the metal of the inner surface of the band with a prick punch. The prick punch is inclined at an angle to the band 10 and the point thereof is forced into the metal of the inner surface thereof which causes a portion of the metal to be upset and raised beyond the inner surface to form the inwardly extending projection 30. The brake lining may be secured to the band in the same manner as previously described.

From the foregoing description, it is apparent that a brake band construction of this nature may be economically made and that the brakes will not "squeal" when the brake lining and brake drum are brought into contact because there is no metal to metal contact as in the present constructions.

As shown in the several views the projections are triangularly shaped, but it is to be understood that projections of any suitable shape may be used equally as well.

While I have shown a brake lining attached to a brake band of the "external" type, it will be readily understood that the same may be attached to a brake band of the "internal" type in substantially the same manner and with the same advantageous results.

Formal changes may be made in the specific embodiment of the invention described without departing from the spirit and substance of the broad invention, the scope of which is commensurate with the appended claims.

What I claim is:

1. The method of forming a braking element consisting in punching a plurality of projections in the circumference of a brake band to extend radially of said band, coating a brake lining with an adhesive substance on the side to contact with said band, applying said lining to said band, and securing said band and lining around a cylindrical template so that said projections are imbedded in but not projecting through said lining to prevent relative movement between said band and lining.

2. The method of forming a braking element consisting in rolling a brake band to shape, forming projections in the circumference of said band, coating a brake lining with an adhesive substance on the side to contact with said band, applying said lining to said band, and securing said band and lining around a cylindrical template so that said projections are imbedded in said lining to prevent relative movement between said band and lining.

3. The method of forming a braking element consisting in rolling a brake band to shape, forming projections in the circumference of said band, coating a brake lining with an adhesive substance on the side to contact with said band, applying said lining to said band, placing said band and lining around a cylindrical template, and drawing the free ends of said band and lining together around said template so that said projections are imbedded in said lining to prevent relative movement between said band and lining.

Signed by me at South Bend, Indiana, this 15th day of March, 1927.

SYDNEY SMITH.